Patented June 18, 1929.

1,717,489

UNITED STATES PATENT OFFICE.

BRONSON BARLOW, OF MADISON, WISCONSIN.

FRUIT PRODUCT AND METHOD OF MAKING THE SAME.

No Drawing.   Application filed August 4, 1924. Serial No. 729,970.

My invention relates to sun-dried and evaporated fleshy fruits for use as human food. The process comprises combining the expressed juice of one fruit with another fruit which has been sun-dried or evaporated or which is in process of such drying.

The dried fruits employed in my process are the dried fruits of commerce as apples, prunes, raisins, and the like. Any fleshy fruit which on pressure yields a desirable juice may be used to furnish the fruit juice. Agreeable combinations will usually result on combining fruits of opposite or unlike qualities, as the highly flavored with the insipid and the sour with the sweet.

Citrous fruits, especially the lemon and the lime, are well suited to furnish juice to combine with prunes and raisins. The juice of sour grapes is ideal for combination with raisins. Such juice changes the raisin into a raisin-currant or grape-raisin superior to the imported currant in size, sweetness and flavor and superior to the raisin in acidity and flavor and with as great a range of flavors as is found among all the varieties of grapes whether of European or American origin.

Having thus indicated the range of materials and the basis of their selection, I will proceed to describe the methods which I have invented for their combination.

Fruits are sun-dried or evaporated to the end or toward the end of the usual process. The expressed fruit juice is now sprayed upon the dried or partly dried fruit and the drying is continued. The spraying may be repeated with intervals of drying between until the desired result is obtained. A power tank sprayer with a clean wooden tank may be used or any other convenient form of sprayer.

Instead of applying the expressed fruit juice in the form of spray, I may immerse the dry or drying fruit in the fruit juice for a short time and then put it again to dry, repeating the process until the desired result is fully obtained. Either process may thus be applied to fruits undergoing the primary or initial drying from the state and condition of freshly gathered ripe fruit.

My process likewise can be applied at any convenient time and at any place near to or distant from the place where the dried fruit was grown. For example, raisins in bulk can be shipped from California to the areas producing table grapes in Michigan or in New York and there the raisins can be drenched with or immersed in grape juice newly pressed, from say, Concord grapes. The moistened raisins can then be dried in the usual form of fruit evaporators and the process repeated if desired.

Dried prunes may be handled in the same manner. Prunes may be heated with juice pressed from lemons, producing a prune of superior quality and utilizing a grade of lemons left in sorting the fruit for market.

Citrous fruits as the lime, the lemon and the grape fruit have not hitherto been offered as dried fruits. Indeed it would be difficult to dry them. The process which I have invented makes these fruits available at least in combination with other dried fruits, as apples, pears and prunes.

For certain purposes, as for cookery, the fruit juice remaining on the soaked raisins or prunes may be dried there and the finished product will be more or less sticky. As a confection, however, it may be desirable to remove such excess juice from the soaked fruit by washing with water before drying. I may mix the expressed juice of one fruit with the juice of another to combine in one product desired properties of two or more fruits.

Dried prunes, soaked in lemon juice and dried again, form lemon-prune, one of the choicest products of the present invention. The prune so treated retains its attractive form, color, texture, and sweetness and the juice of the lemon adds a tonic bitterness, a refreshing citric sourness and a natural lemon flavor. Moreover, the juice of the lemon enriches the prune in water soluble vitamines so that the lemon-prune is valuable on shipboard and in the diet of the people.

I claim:

1. A method of making a synthetic dried whole fruit, comprising subjecting an uncooked fruit of one kind to drying action, drenching the dried or partially dried fruit with the expressed uncooked juice of another kind of fruit and subjecting the treated fruit to further drying action.

2. Synthetic dried currants consisting of whole raisins containing juice of citrous fruit.

3. A synthetic dried whole fruit of the raisin type comprising a whole raw fruit of said type, dried and containing the dried residue of raw juice of another fruit.

4. A synthetic dried whole fruit of the raisin type comprising a whole raw fruit of said type, dried and containing the dried residue of the raw juice of a citrous fruit.

In witness whereof, I have hereunto subscribed my name.

BRONSON BARLOW.